United States Patent
Zheng et al.

(10) Patent No.: US 11,438,402 B2
(45) Date of Patent: Sep. 6, 2022

(54) SYSTEMS AND METHODS FOR PROVIDING A WEB APPLICATION TO A COMPUTING DEVICE

(71) Applicants: Jun Zheng, Mississauga (CA); DanChun Zheng, Mississauga (CA)

(72) Inventors: Jun Zheng, Mississauga (CA); DanChun Zheng, Mississauga (CA)

(73) Assignee: BizupSolutions Inc., Mississauga (CA)

( * ) Notice: Subject to any disclaimer, the term of this patent is extended or adjusted under 35 U.S.C. 154(b) by 0 days.

(21) Appl. No.: 17/022,845

(22) Filed: Sep. 16, 2020

(65) Prior Publication Data

US 2021/0092180 A1    Mar. 25, 2021

Related U.S. Application Data

(60) Provisional application No. 62/903,075, filed on Sep. 20, 2019.

(51) Int. Cl.
*H04L 29/08* (2006.01)
*H04L 67/02* (2022.01)
(Continued)

(52) U.S. Cl.
CPC ............... *H04L 67/02* (2013.01); *G06F 8/20* (2013.01); *G06F 8/63* (2013.01); *G06F 9/44505* (2013.01);
(Continued)

(58) Field of Classification Search
CPC . G06F 16/972; G06F 8/20; G06F 8/60; G06F 8/63; H04L 69/329; H04L 67/02
See application file for complete search history.

(56) References Cited

U.S. PATENT DOCUMENTS 9,524,157 B2 * 12/2016 Oliver ...................... G06F 8/65
9,952,738 B1 * 4/2018 Kumar .................. G06F 3/048
(Continued)

OTHER PUBLICATIONS

Google Developers, "Introduction to Progressive Web App Architectures." Web. Available: https://developers.google.com/web/ilt/pwa/introduction-to-progressive-web-app-architectures. 37 pages, Access date: Apr. 3, 2019.

*Primary Examiner* — Chirag R Patel
(74) *Attorney, Agent, or Firm* — Bereskin & Parr LLP/S.E.N.C.R.L., s.r.l.

(57) ABSTRACT

System and methods are provided for providing a web application to a computing device. The method involves operating a system processor to: receive, from the computing device, an application request including an application identifier associated with the web application; retrieve, from a data storage, an application template corresponding to the application identifier; build an application structure based at least on the retrieved application template and the application identifier; and transmit the application structure and a structure resolver to the computing device, the receipt of the structure resolver at the computing device triggers a device processor to resolve each dynamic content component defined within the application structure by: determining, from the application structure, a layout definition of the dynamic content component, constructing the dynamic content component based on the layout definition, and retrieving a content data for the dynamic content component from the data storage.

18 Claims, 5 Drawing Sheets

(51) Int. Cl.
*H04L 67/55* (2022.01)
*H04L 67/56* (2022.01)
*G06F 9/445* (2018.01)
*G06F 8/61* (2018.01)
*G06F 8/20* (2018.01)
*H04L 67/01* (2022.01)

(52) U.S. Cl.
CPC .............. *H04L 67/26* (2013.01); *H04L 67/28* (2013.01); *H04L 67/42* (2013.01)

(56) References Cited

U.S. PATENT DOCUMENTS

| | | | |
|---|---|---|---|
| 2008/0172600 A1* | 7/2008 | Bokor | G06F 16/958 |
| | | | 715/234 |
| 2009/0216758 A1* | 8/2009 | Tuttle | G06F 16/951 |
| 2012/0036264 A1 | 2/2012 | Jiang et al. | |
| 2015/0278171 A1 | 10/2015 | Lefebvre et al. | |
| 2017/0153883 A1* | 6/2017 | Oliver | H04L 67/02 |
| 2017/0300861 A9 | 10/2017 | Avats | |
| 2019/0370018 A1* | 12/2019 | Kirkpatrick | G06F 8/61 |
| 2021/0191996 A1* | 6/2021 | Li | G06F 16/958 |

\* cited by examiner

SYSTEMS AND METHODS FOR PROVIDING A WEB APPLICATION TO A COMPUTING DEVICE

CROSS-REFERENCE TO RELATED PATENT APPLICATIONS

This application claims the benefit of U.S. Provisional Application No. 62/903,075, filed on Sep. 20, 2019. The complete disclosure of U.S. Provisional Application No. 62/903,075, is incorporated herein by reference.

FIELD

The described embodiments relate to systems and methods for providing a web application to a computing device.

BACKGROUND

The use of mobile computing devices, such as, but not limited to, smart-watches, electronic tablets, and smartphones, is increasingly common. Mobile computing devices can provide various functionalities through mobile applications, such as communication, e-commerce, navigation, and gaming. Mobile applications include computer programs that are designed to run on mobile computing devices.

Some mobile applications are native applications that are restricted to specific mobile platforms. Installing native mobile applications, however, require time and network resources, as well as device memory. Although native mobile applications can offer convenience and added functionality, the number of native mobile applications available in the marketplace continues to grow, which can often lead to an overload of native mobile applications in mobile computing devices.

SUMMARY

The various embodiments described herein generally relate to methods (and associated systems configured to implement the methods) for providing a web application to a computing device. In accordance with some embodiments, there is provided a method for providing a web application to a computing device. The method involves operating a system processor to: receive, from the computing device, an application request including an application identifier associated with the web application; retrieve, from a data storage, an application template corresponding to the application identifier; build an application structure based at least on the retrieved application template and the application identifier; and transmit the application structure and a structure resolver to the computing device, the receipt of the structure resolver at the computing device triggers a device processor to resolve each dynamic content component defined within the application structure by: determining, from the application structure, a layout definition of the dynamic content component, constructing the dynamic content component based on the layout definition, and retrieving a content data for the dynamic content component from the data storage.

In some embodiments, resolving each dynamic content component defined within the application structure involves: determining, from the layout definition, the dynamic content component includes at least one nested dynamic content component; and in response to determining the dynamic content component includes the at least one nested dynamic content component, operating the device processor to resolve each nested dynamic component by: determining a layout definition for a first level component of the nested dynamic content component; and constructing the first level component of the nested dynamic content component based on the layout definition, wherein constructing the first level component involves: determining a layout definition for a subsequent level component of one or more subsequent level components; and constructing each subsequent level component.

In some embodiments, constructing each subsequent level component involves retrieving the content data for the respective subsequent level component.

In some embodiments, constructing each subsequent level component involves: determining a layout definition for a further subsequent level component of one or more further subsequent level components; and constructing each further subsequent level component.

In some embodiments, constructing the first level component involves: determining a layout definition for each subsequent level component and constructing the respective subsequent level component until the layout definition for a subsequent level component includes a lowest level component.

In some embodiments, receiving the application request involves determining the application identifier from the received application request.

In some embodiments, the application request involves at least a portion of a Uniform Resource Locator (URL) related to the web application.

In some embodiments, building the application structure involves: retrieving from the database at least one dynamic content component definition corresponding to the application identifier; and building the application structure based at least on the retrieved application template, the retrieved at least one dynamic content component definition, and the application identifier.

In some embodiments, the receipt of the structure resolver triggers the device processor to retrieve template content data corresponding to the application template.

In some embodiments, the template content data includes an application component selected from the group consisting of an application icon and a splash screen.

In some embodiments, the web application includes a progressive web application.

In some embodiments, the receipt of the structure resolver at the computing device further triggers the device processor to establish at least one connection between the computing device and a web application server.

In some embodiments, establishing the at least one connection involves receiving, at the computing device, at least one push message from the web application server.

In some embodiments, establishing the at least one connection involves transmitting at least one synchronization message from the computing device to the web application server.

In some embodiments, establishing the at least one connection involves initiating at least one service worker.

In some embodiments, the content data includes at least one of: text data, image data, audio data, video data, and/or metadata.

In some embodiments, the content data for the dynamic content component is retrieved based at least on a type of the web application.

In accordance with some embodiments, there is provided a system for providing a web application to a computing device. The system includes: a processor operable to: receive, from the computing device, an application request including an application identifier associated with the web application; retrieve from a data storage an application template corresponding to the application identifier; build an application structure based at least on the retrieved application template and the application identifier; and transmit the application structure and a structure resolver to the computing device, the receipt of the structure resolver at the computing device triggers a device processor to resolve each dynamic content component defined within the application structure by: determining, from the application structure, a layout definition of the dynamic content component, constructing the dynamic content component based on the layout definition, and retrieving a content data for the dynamic content component from the data storage.

In some embodiments, resolving each dynamic component defined within the application structure includes: determining from the layout definition, the dynamic content component includes at least one nested dynamic content component; and in response to determining the dynamic content component includes the at least one nested dynamic component, operating the device processor to resolve each nested dynamic component by: determining a layout definition for a first level component of the nested dynamic content component; constructing the first level component of the nested dynamic content component based on the layout definition, wherein constructing the first level component includes: determining a layout definition for a subsequent level component of one or more subsequent level components; and constructing each subsequent level component.

In some embodiments, constructing each subsequent level component includes retrieving the content data for the respective subsequent level component.

In some embodiments, constructing each subsequent level component includes: determining a layout definition for a further subsequent level component of one or more further subsequent level components; and constructing each further subsequent level component.

In some embodiments, constructing the first level component includes: determining a layout definition for each subsequent level component and constructing the respective subsequent level component until the layout definition for a subsequent level component includes a lowest level component.

In some embodiments, receiving the application request includes determining the application identifier from the received application request.

In some embodiments, the application request includes at least a portion of a Uniform Resource Locator (URL) related to the web application.

In some embodiments, building the application structure includes: retrieving from the database at least one dynamic content component definition corresponding to the application identifier; and building the application structure based at least on the retrieved application template, the retrieved at least one dynamic content component definition, and the application identifier.

In some embodiments, the receipt of the structure resolver triggers the device processor to retrieve template content data corresponding to the application template.

In some embodiments, the template content data includes at least one of an application icon and/or a splash screen.

In some embodiments, the web application includes a progressive web application.

In some embodiments, the application structure includes at least one proxy initializer; and the proxy initializer triggers the processor of the computing device to establish at least one connection between the computing device and a second computing device.

In some embodiments, the at least one connection delivers at least one push message from the second computing device to the computing device.

In some embodiments, the at least one connection delivers at least one synchronization message from the computing device to the second computing device.

In some embodiments, establishing the at least one connection includes initiating at least one service worker.

In some embodiments, the content data includes at least one of: text data, image data, audio data, video data, and metadata.

In some embodiments, the content data for the dynamic content component is retrieved based at least on a type of the web application In accordance with some embodiments, there is provided a method of creating a web application. The method involves operating a system processor to: receive, from a computing device, a template request for an application template stored at a data storage; receive from the computing device template content data corresponding to the application template; define an application identifier for the web application based at least on the template content data; receive from the computing device, a dynamic content component request; generate at least one dynamic content component definition based on the dynamic content component request, each dynamic content component definition including a layout definition; and store at the data storage the template content data and the at least one dynamic content component definition, based on the application identifier.

In some embodiments, the template content data includes at least one of: an application icon and/or a splash screen.

In some embodiments, method further involves including operating the processor to: receive from the computing device content data corresponding to the dynamic content component definition; and store at the database the content data.

In some embodiments, the content data includes at least one of: text data, image data, audio data, video data, and/or metadata.

In some embodiments, the dynamic content component request includes at least one user gesture and the method further involves operating the system processor to: determine the layout definition based on the at least one user gesture.

In some embodiments, at least one dynamic content component definition defines at least one nested dynamic content component, each nested dynamic content component definition including a layout definition.

In accordance with some embodiments, there is provided a system for creating a web application. The system includes a processor operable to: receive, from a computing device, a template request for an application template stored at a data storage; receive from the computing device template content data corresponding to the application template; define an application identifier for the web application based at least on the template content data; receive from the computing device, a dynamic content component request; generate at least one dynamic content component definition based on the dynamic content component request, each dynamic content component definition including a layout definition; and store at the data storage the template content data and the at least one dynamic content component definition, based on the application identifier.

In some embodiments, the template content data includes at least one of: an application icon and/or a splash screen.

In some embodiments, the processor is further operable to: receive from the computing device content data corresponding to the dynamic content component definition; and store at the database the content data.

In some embodiments, the content data includes at least one of: text data, image data, audio data, video data, and/or metadata.

In some embodiments, the dynamic content component request includes at least one user gesture and the processor is further operable to: determine the layout definition based on the at least one user gesture.

In some embodiments, at least one dynamic content component definition defines at least one nested dynamic content component, each nested dynamic content component definition includes a layout definition.

BRIEF DESCRIPTION OF THE DRAWINGS

Several embodiments will now be described in detail with reference to the drawings, in which.

The drawings, described below, are provided for purpose of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

Web applications, or web apps, include computer programs that do not run directly on the operating system of a computing device and instead run on another application, such as a web browser. Web applications can be implemented using various markup languages, such as HTML (Hypertext Markup Language) or CSS (Cascading Style Sheets), and/or various scripting languages, such as Javascript, that may be executed by the application. Web applications can run on different types of computing devices, regardless of operating systems.

A dynamic web page is an example web application. A dynamic web page is a web page that is executed by a web browser and contains content that can vary over time, such as, in response to a user input. Another example web application is a progressive web application ("PWA"). Progressive web applications run in a web browser, but include functionalities that are traditionally associated with native applications, such as offline operation, push notifications, and device hardware access. Another example web application is a mini program, which runs in WeChat™. Another example web application is an Ali mini program or an Ali H5.

In order to execute a web application on a computing device, certain resources may need to be provided to the computing device. For example, for a dynamic web page, various content and layout information may be required for the web browser to render and display the dynamic web page. Accordingly, the computing device may need to download these resources from a server. However, it can be difficult to provide the resources required to execute a web application to a computing device. For example, communication with a mobile device may be limited in speed and/or bandwidth. The mobile device may not be able to receive the resources required to run the web application in a timely manner.

The various embodiments disclosed herein generally relate to methods (and associated systems configured to implement the methods) for providing a web application to a computing device. The disclosed systems and methods involve transmitting a structure resolver to the computing device that can trigger the computing device to resolve dynamic content components. The web application provisioning system disclosed herein can manage the resources transmitted to the computing device to reduce initial transmission overhead. As a result, the web application provisioning system can enable the web application to be displayed at the computing device with minimal delays. The embodiments disclosed herein can also be applied for generating a native application, a mini application, a mini program (e.g., which runs in WeChat™), an Ali H5, and/or an Ali mini program.

Figure 1:
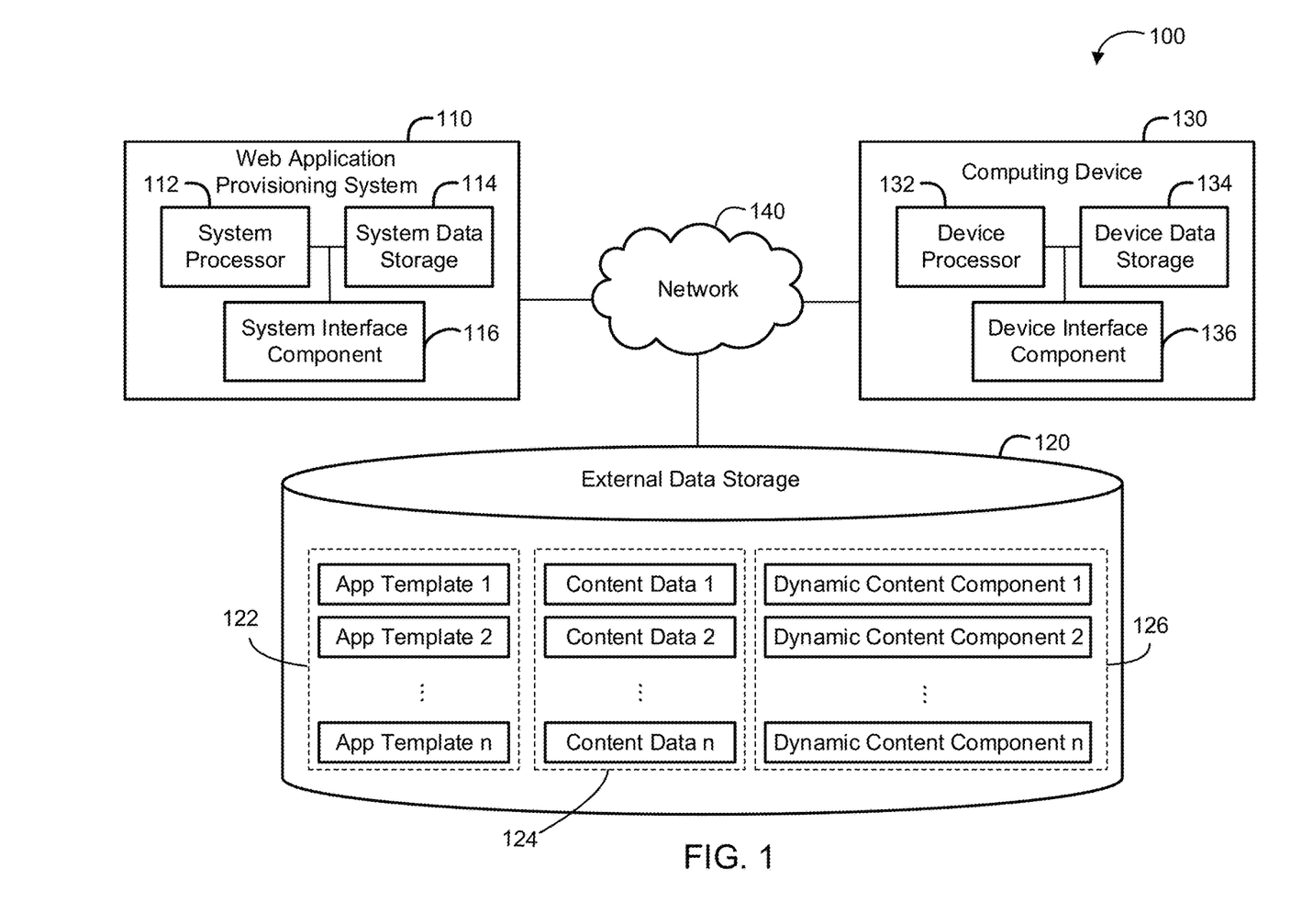
FIG. 1 is a block diagram of components interacting with a web application provisioning system, in accordance with an example embodiment.

Reference is first made to FIG. 1, which illustrates a block diagram 100 of components interacting with an example web application provisioning system 110. The web application provisioning system 110 includes a system processor 112, a system interface component 116, and a system data storage 114. As shown in FIG. 1, the web application provisioning system 110 can be in communication with an external data storage 120 and a computing device 130 via a network 140. Although the web application provisioning system 110 is shown as one component in FIG. 1, in some embodiments, the web application provisioning system 110 can be provided with one or more servers distributed over a wide geographic area and connected via the network 140.

The system processor 112 may be any suitable processor, controller or digital signal processor that provides sufficient processing power depending on the configuration, purposes and requirements of the web application provisioning system 110. In some embodiments, the system processor 112 can include more than one processor with each processor being configured to perform different dedicated tasks. The system processor 112 controls the operation of the web application provisioning system 110. For example, the system processor 112 can receive, an application request from the computing device 130 and transmit, in accordance with the methods disclosed herein, an application structure and a structure resolver to the computing device 130.

The system interface component 116 may be any interface that enables the web application provisioning system 110 to communicate with other devices and systems. In some embodiments, the system interface component 116 can include at least one of a serial port, a parallel port or a USB port. The system interface component 116 may also include at least one of an Internet, Local Area Network (LAN), Ethernet, Firewire, modem or digital subscriber line connection. Various combinations of these elements may be incorporated within the system interface component 116. For example, the system interface component 116 may receive input from various input devices, such as a mouse, a keyboard, a touch screen, a thumbwheel, a track-pad, a track-ball, a card-reader, voice recognition software and the like depending on the requirements and implementation of the web application provisioning system 110.

The system data storage 114 can include RAM, ROM, one or more hard drives, one or more flash drives or some other suitable data storage elements such as disk drives, etc. For example, the system data storage 114 can include a memory on which one or more databases or file system(s) are stored. The database(s) can store information related to providing web applications, such as, but not limited to application templates, content data, and dynamic content component definitions.

Similar to the system data storage 114, the external data storage 120 can include RAM, ROM, one or more hard drives, one or more flash drives or some other suitable data storage elements such as disk drives, etc. The external data storage 120 can include a memory on which one or more databases or file system(s) are stored. Although only one external data storage 120 is shown, there may be multiple external data storages 120 distributed over a wide geographic area and connected via the network 140.

The external data storage 120 can be accessed by the web application provisioning system 110 via the network 140. The external data storage 120 can act as a back-up data storage to the system data storage 114 and/or store at least some of the data related to providing a web application. In some embodiments, the external data storage 120 can store data that is not as frequently used by the web application provisioning system 110, or larger size data.

In FIG. 1, for illustrative purposes, it is shown that the external data storage 120 stores a plurality of application templates 122, a plurality of content data 124, and a plurality of dynamic content component definitions 126. The application templates 122, content data 124, and dynamic content component definitions 126 can be stored separately, or in different combinations, in some embodiments. In some embodiments, the application templates 122, content data 124, and/or dynamic content component definitions 126 can be stored in the system data storage 114 of the web application provisioning system 110.

Each of the system processor 112, the system interface component 116, and the system data storage 114 may be combined into a fewer number of components or may be separated into further components. The system processor 112, the system interface component 116, and the system data storage 114 may be implemented in software or hardware, or a combination of software and hardware.

The computing device 130 may be any networked device operable to connect to the network 140. A networked device is a device capable of communicating with other devices through a network such as the network 140. A networked device may couple to the network 140 through a wired or wireless connection. Although only one computing device 130 is shown in FIG. 1, there may be multiple computing devices 130 in communication with the web application provisioning system 110 via the network 140.

The computing device 130 includes a device processor 132, a device data storage 134, and a device interface component 136. The computing device 130 may be an electronic tablet device, a personal computer, workstation, server, portable computer, mobile device, personal digital assistant, laptop, smart phone, WAP phone, an interactive television, video display terminals, gaming consoles, and portable electronic devices or any combination of these. In some embodiments, the computing device 130 may be a laptop or a smartphone device equipped with a network adapter for connecting to the internet.

Figure 2:
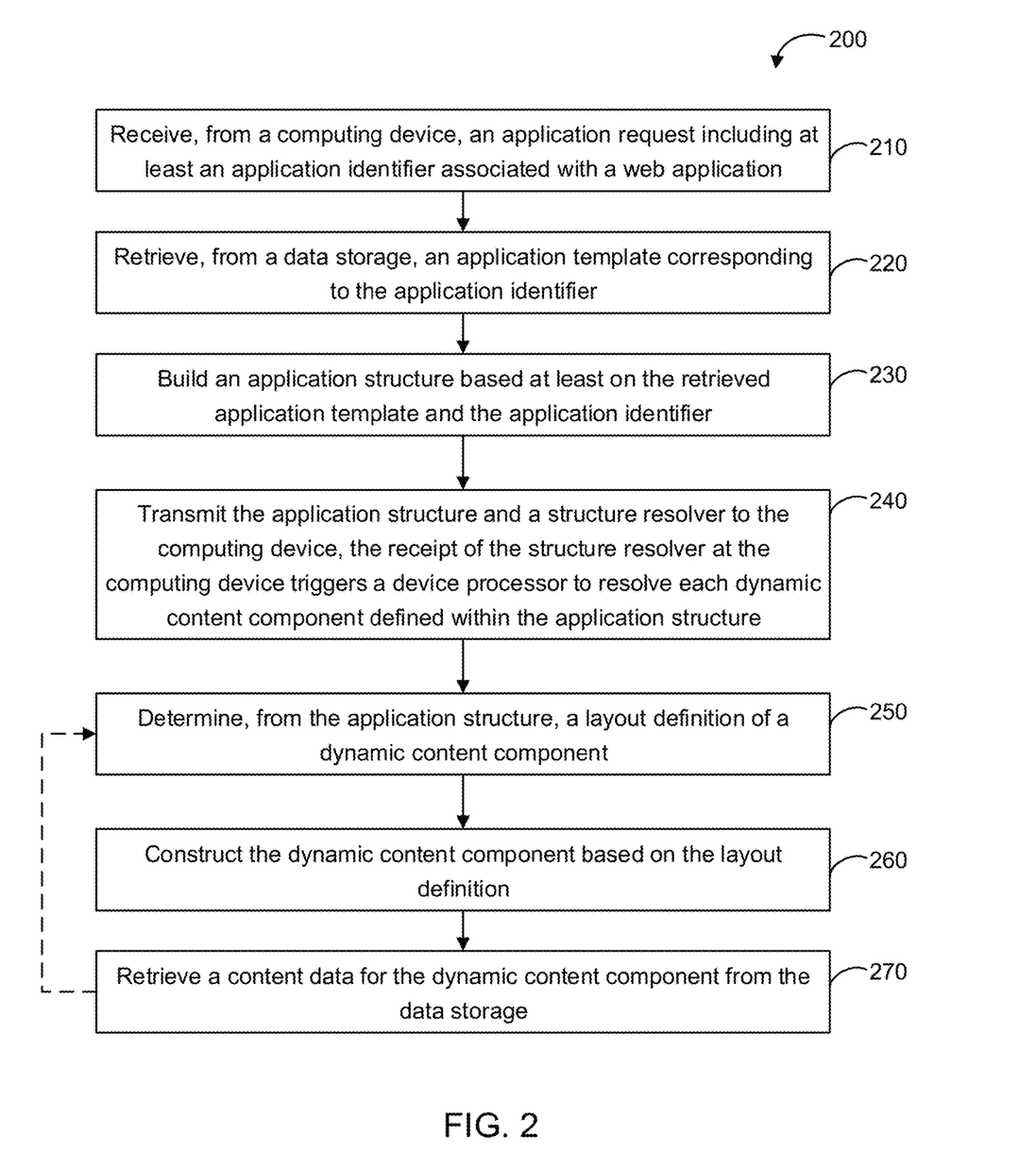
FIG. 2 is a flowchart of an example method of operating the web application provisioning system for providing a web application to a computing device.

Referring now to FIG. 2, shown therein is a flowchart illustrating an example method 200 of operating the web application provisioning system 110 for providing a web application to the computing device 130. To illustrate the method 200, reference will be made to FIGS. 3 and 4, which illustrate example web application interfaces 300, 400 provided by the web application provisioning system 110.

The web application provisioning system 110 can provide the computing device 130 with a web application that can be run on the computing device 130, such as, but not limited to, a dynamic web application, a progressive web application, a mini program (e.g., which runs in WeChat™), an Ali mini program, or an Ali H5.

At 210, the web application provisioning system 110 receives an application request from the computing device 130. The application request can be a request to provide the web application to the computing device 130. The application request can include an application identifier associated with the web application. The application identifier can be any identifier identifying the web application requested by the computing device 130. For example, the application identifier can include at least a portion of a Uniform Resource Locator (URL) related to the web application. In some embodiments, the application identifier may identify the type of web application to be provided. For example, the application identifier may identify the web application as a dynamic web application, a progressive web application, a mini program (e.g., which runs in WeChat™), an Ali mini program, or an Ali H5.

In some embodiments, the web application provisioning system 110 can receive the application request, which includes a request to download a link to the web application onto the computing device 130 instead of browsing the web application via a web browser.

Figure 3:
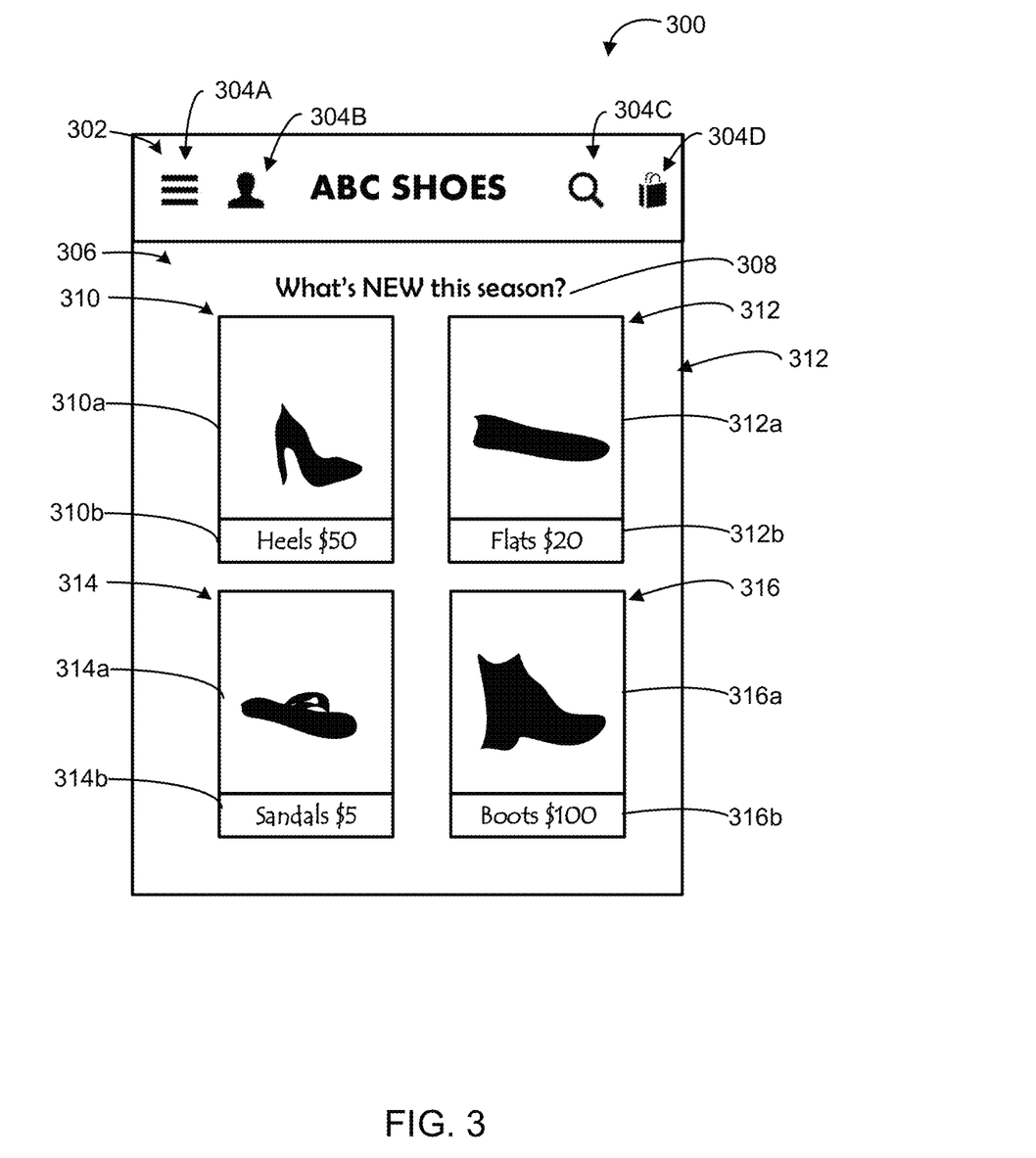
FIG. 3 shows an example web application interface generated by the web application provisioning system.

Referring now to FIG. 3, which illustrates an example web application interface 300 for an online shoe store. The online shoe store is named "ABC Shoes", as shown in FIG. 3. The web application interface 300 can be accessible via an application, such as a web browser, at the computing device 130 at the URL "www.ABCShoes.com". The application request can include a portion of the URL, such as "ABCShoes.com", or a unique identifier associated with the web application interface 300, such as the identifier "ABCShoes", or other identifier that can direct the web application provisioning system 110 to the web application interface 300.

At 220, the web application provisioning system 110 retrieves, from the external data storage 120, an application template 122 corresponding to the application identifier. The application template 122 can define various content components. The content components can define a skeleton structure for the web application, such as the layout for the content components (e.g., arrangement and/or position of the data content within each webpage), the webpages within the web application, and how each webpage relates to the other. In some embodiments, multiple web applications can use the same application template 122.

As shown in FIG. 3, the web application interface 300 includes various data content, such as a header 302 that includes icons 304 selectable for obtaining more information and/or navigation options, and a data container 306 for providing a set of data contents. The application template 122 for ABCShoes web application can define the header 302 and the data container 306, including the data content within each as well as the relative positions of each as well as the data content within each. The application template 122 can also define how the other webpages of the ABCShoes web application are related to each other, and their respective layouts.

At 230, the web application provisioning system 110 builds an application structure based at least on the retrieved application template and the application identifier. The application structure provides the details for the content components defined by the application template for the ABCShoes web application, including the relative positions of the content components and the data storage 114, 120 from which the data can be retrieved. For example, the application structure can include data related to the HTML structure of the web application and related data required for generating the web application. The HTML structure can include the document object model (DOM), for example. The document object model can include objects that represent each of the dynamic content components and the corresponding layout. The application structure can include compressed data related to the layout of the web application. The web application provisioning system 110 does not retrieve the content data from the data storage 114, 120 at this stage.

For example, the application structure can specify the icons 304 defined within the application template 122 to include a navigation icon 304A selectable for accessing other webpages of the online shoe store web application, a user profile icon 304B selectable for obtaining more details on a user profile, a search icon 304C selectable for conducting a search of the online shoe store web application, and a shopping bag icon 304D selectable for accessing the shopping bag, as well as the relative positions of each of the icons 304.

The application structure can define dynamic content components, including their respective layouts and positions. Dynamic content components include data components that are executed at run-time by the web application provisioning system 110. At the application structure, the dynamic content components can act as placeholders for content and/or functionality and at run-time, the web application provisioning system 110 can provide the necessary data contents for the dynamic content components.

Continuing with the example ABCShoes web application interface shown in FIG. 3, the content components within the data container 306 can be dynamic content components. When building the application structure, the web application provisioning system 110 can define the locations of the content components within the data container 306 as dynamic content components. The dynamic content components can, in some embodiments, be associated with a type of data, such as a text box 308, image data content 310a, 312a, 314a and 316a, and corresponding text data content 310b, 312b, 314b, and 316 to the image data content 310a, 312a, 314a and 316a. When the web application provisioning system 110 receives a request for the ABCShoes web application, the web application provisioning system 110 can then provide the application structure to the computing device 130. The content data of the dynamic content components, as will be described, will be resolved.

At 240, the web application provisioning system 110 transmits the application structure and a structure resolver to the computing device 130.

The application structure includes a compressed data structure for the web application and so, the transmission of the application structure and structure resolver by the web application provisioning system 110 requires minimal bandwidth. At receipt of the structure resolver, the structure resolver can trigger the device processor 132 to resolve each content component defined within the application structure. For example, at 250, the computing device 130 is triggered by the structure resolver to determine, from the application structure, a layout definition of each dynamic content component. The layout definition of a dynamic content component can define the arrangement or position of the placeholders defined by the dynamic content component (and therefore the eventual content).

Continuing with the example web application interface 300 shown in FIG. 3, the device processor 132 can be triggered by the structure resolve to determine from the application structure that the layout includes a two columns of data contents, such as content components 310 and 314 shown in the first column (on the left) and content components 312 and 316 shown in the second column (on the right). Although only two rows of data contents are shown in FIG. 3, additional rows of data contents can be provided via the web application interface 300 when scrolled downwards, for example.

The computing device 130 can then be triggered to construct the web application interface 300 (at 260) according to the application structure. For example, the structure resolver can trigger the computing device 130 to construct the dynamic content components according to the layout definition provided in the application structure. The computing device 130 can construct the dynamic content components by generating the web application interface 300 associated web application framework. In the example shown in FIG. 3, for example, the computing device 130 can be triggered to construct the layout for the dynamic content components 308, 310, 312, 314 and 316.

At 270, the computing device 130 can then retrieve the content data for the dynamic content components from the data storage 120.

After constructing the web application interface 300 framework, the computing device 130 can request for the content data for the dynamic content component from the web application provisioning system 110. The web application provisioning system 110 can then retrieve the content data from the data storage 120 based on application data stored in respect of the web application at the data storage 120, and provide the content data to the computing device 130. The content data may be, for example, text data, image data, audio data, video data, and/or metadata. The computing device 130, as triggered by the structure resolver, can render the web application interface 300 using the dynamic content components and the respective content data. In various embodiments, the content data retrieved by the web application provisioning system 110 may depend on the type of web application being provided. That is, the web application provisioning system 110 may retrieve different content data, depending on whether the web application to be provided is a dynamic web application, a progressive web application, a mini program (e.g., which runs in WeChat™), an Ali mini program, or an Ali H5. For example, for a payment interface, the content data may be a credit card information form for a dynamic web application, whereas the content data may be a WeChat Pay interface for a mini program. As another example, for a navigational button, the content data may be a hyperlink for a dynamic web application, whereas the content data may be an action sheet for a native mobile application. Accordingly, the web application provisioning system 110 may retrieve different content data to provide different content and/or functionality, depending on the type of web application being provided. In some embodiments, the web application provisioning system 110 can retrieve the appropriate content data for the type of web application based on the application identifier.

Continuing with the example web application interface 300 in FIG. 3, for example, the computing device 130 can construct the framework for the dynamic content components 308, 310, 312, 314, 316 (at 260) and can then request for the corresponding content data. The computing device 130 can retrieve content data corresponding to the respective dynamic content components 308, 310, 312, 314, 316. For example, the web application interface 300 can determine from application data stored in the data storage 120 that the dynamic content component 308 is associated with a text content data that corresponds to a seasonal title (e.g., "What's new this season?"), and can also determine that the dynamic content components 310, 312, 314, 316 are associated with content data related to shoes being sold, such as image data content 310a, 312a, 314a and 316a of the shoes being sold, and the corresponding text data content 310b, 312b, 314b, and 316b displaying the prices of the shoes being sold. Other content or additional content can be provided.

The web application provisioning system 110 can then transmit the relevant content data to the computing device 130 for completing the construction of the web application interface 300. The content data can be varied by the web application manager via a web application editor tool, for example. The content data can vary with inventory and/or changes in marketing campaigns, for example.

Figure 4:
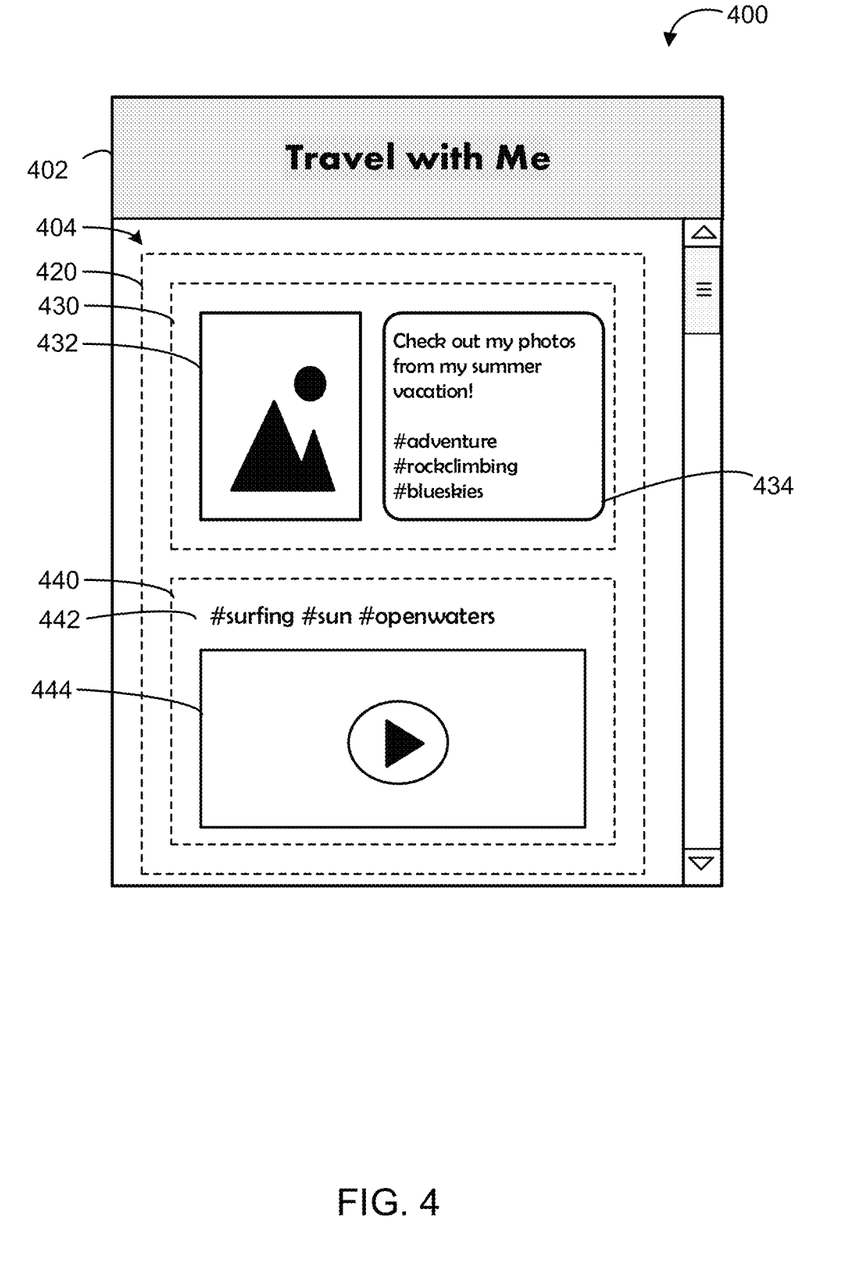
FIG. 4 shows another example web application interface generated by the web application provisioning system.

Reference will now be made to FIG. 4, which shows an example web application interface 400 of a weblog or blog. The weblog can be accessed via an application, such as a web browser, and the web application interface 400 can be displayed at the computing device 130. In some embodiments, the web application can be downloaded onto the computing device 130 and accessed directly without use of the web browser.

As shown in FIG. 4, the web application interface 400 includes various content components, such as header 402 and container 404 which contains nested layout containers 420, 430, 440. The borders of the layout containers 420, 430, 440 are shown in FIG. 4 in broken lines for illustrative purposes. The borders of the layout containers 420, 430, 440 may not be illustrated on the web application interface 400 in some embodiments. In the web application interface 400, the layout containers 420, 430 and 440 relate to dynamic content components with a nested structure.

When the computing device 130 is triggered by the structure resolver at 240 to construct the web application interface 400, the computing device 130 is triggered to resolve the dynamic content components 420, 430, 440 iteratively. For example, the application structure corresponding to the web application interface 400 can include the header 402 followed by the container 404. The application structure can include layout data related to a first level component (e.g., container 420), which can indicate that within the first level component 420, there are subsequent level components 430 and 440. The first level component 420 can be the outermost nested dynamic content component. Subsequent level components 430 and 440 are positioned on top of each other. The computing device 130 can then be triggered to construct subsequent level component 430 according to the application structure. The application structure can then indicate that the subsequent level component 430 includes two adjacent content components, namely an image component 432 and a text component 434. The computing device 130 can then be triggered to construct the image component 432 and retrieve the respective content data from the data storage 120, and to then construct the text component 434 and retrieve the respective content data from the data storage 120. The computing device 130 can then be triggered to continue to construct the subsequent level component 440, which, from the application structure, can be determined to include a text data component 442 on top of a video component 444. Similarly, the computing device 130 can be triggered to construct components 442 and 444, and retrieve the respective content data from the data storage 120. In some embodiments, the computing device 130 can be triggered to determine the type of dynamic content component by sending a request to the web application provisioning system 110.

The example web application interface 400 illustrated in FIG. 4 only illustrates two levels of nested dynamic content components. Depending on the design of the web application interface, further levels of nested dynamic content components can be provided. The computing device 130 can be triggered by the application resolver to construct each level of nested dynamic content components until there are no further levels of nested dynamic content components.

In some embodiments, the receipt of the structure resolver can also trigger the computing device 130 to establish a connection to a web application server. For example, the computing device 130 may initialize one or more service workers. The service workers can act as a proxy connection between the web application and other resources that the web application may not be able to directly access. Various data can be transmitted across the established connection. For example, the computing device 130 may receive one or more push messages to the web application server via the connection. The push messages may allow push notifications to be generated at the computing device 130. In another example, the computing device 130 may transmit one or more synchronization messages to the web application server via the connection. The synchronization messages may allow the web application server to maintain consistency between data stored at the computing device 130 and data stored at the web application, permitting harmonization of the data over time.

As shown in FIGS. 2, 250 to 270 can be repeated until each dynamic content component defined within the application structure is resolved.

Figure 5:
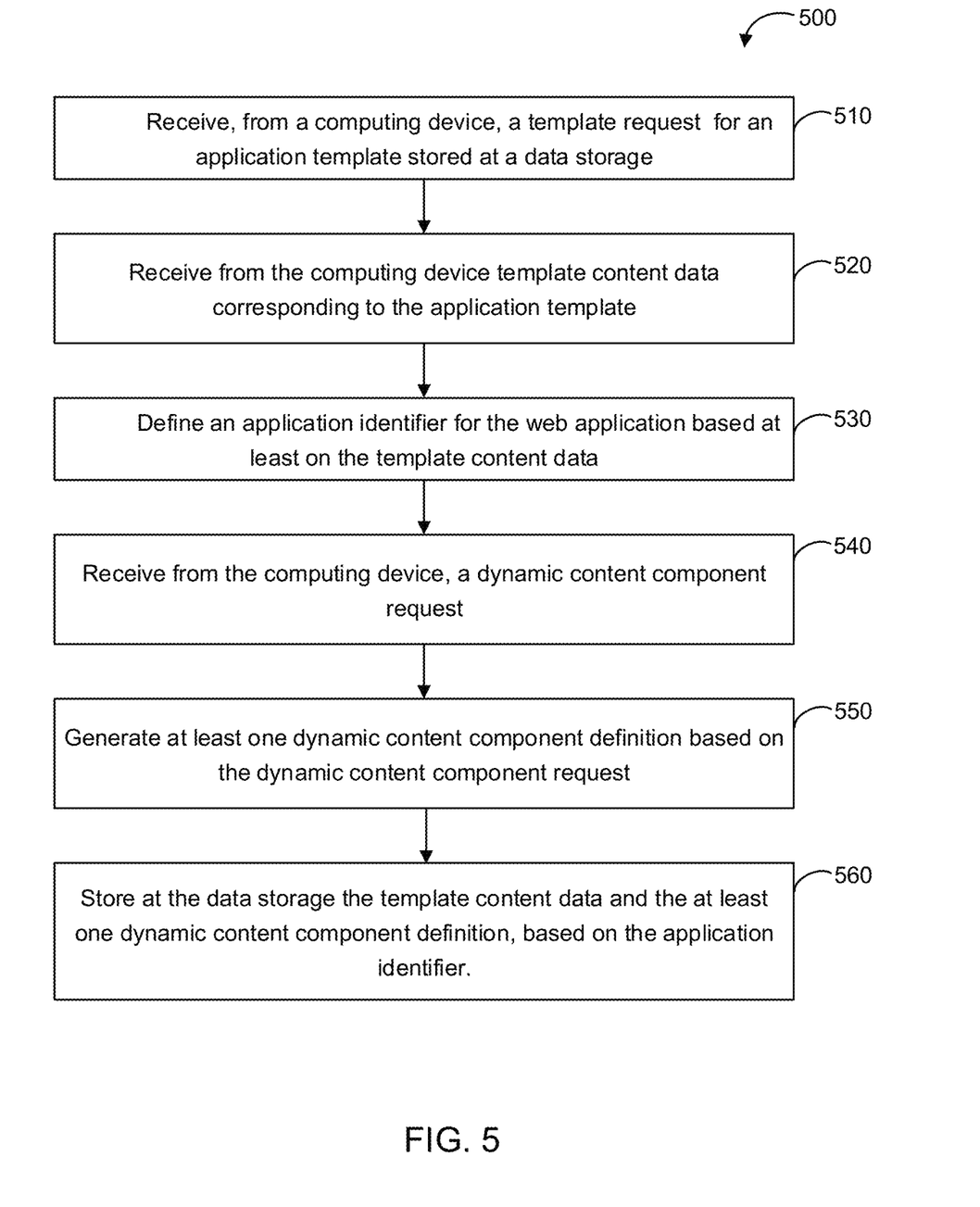
FIG. 5 is a flowchart of an example method of operating the web application provisioning system for creating a web application.

Referring now to FIG. 5, shown therein is a flowchart illustrating an example method 500 of operating the web application provisioning system 110 for creating a web application. For example, the web application provisioning system 110 can provide a web application editor interface which can receive user inputs and/or content data defining the layout and/or design of the web application interface.

At 510, the web application provisioning system 110 receives, from the computing device 130, a template request for an application template stored at the data storage 120.

For example, via the web application editor interface, the web application provisioning system 110 can receive a template request from a user seeking to create the web application interface 300 of FIG. 3. The template request can be based on a selection of a set of existing templates available to the user via the web application editor interface. In some embodiments, the template request can include one or more characteristics (e.g., type of web application—electronic commerce, weblog, etc.; intended audience; type of business, etc.) related to the web application interface 300 that the user intends to create. The web application provisioning system 110 can then automatically select an application template based on the characteristics defined within the template request. For example, the web application provisioning system 110 can select an application template that is suited for a restaurant business based on the data provided in the template request.

At 520, the web application provisioning system 110 receives, from the computing device 130, template content data corresponding to the application template. The template content data can correspond to content that is defined in the application template. For example, the template content data can include text data, image data, audio data, video data, and/or metadata. In some embodiments, the template content data can include components of the web application that is universal across the various webpages, such as an application icon and/or a splash screen. In respect of the web application interface 300, the template content data can include the text data ("ABC SHOES") in the header 302.

At 530, the web application provisioning system 110 defines an application identifier for the web application based at least on the template content data. As described, the application identifier can be any identifier for identifying the web application. For example, the application identifier can include at least a portion of a Uniform Resource Locator related to the web application, such as "ABCshoes.com", or "ABC Shoes" for web application interface 300.

At 540, the web application provisioning system 110 receives, from the computing device 130, a dynamic content component request. The dynamic content component request can be a request to generate one or more dynamic content components. With respect to FIG. 3, the dynamic content component request can relate to the generation of dynamic content components 310, 312, 314 and 316.

At 550, the web application provisioning system 110 generates at least one dynamic content component definition based on the dynamic content component request. Each dynamic content component definition can include a layout definition. The dynamic content component definitions can define the dynamic content components, such as dynamic content components 310, 312, 314 and 316 of FIG. 3. The dynamic content component definitions can include the arrangement or location of the image data contents 310a, 312a, 314a, and 316a and the corresponding text data contents 310b, 312b, 314b, and 316b.

In some embodiments, the dynamic content component definition can define at least one nested dynamic content component. Each nested dynamic content component definition can also include a layout definition.

At 560, the web application provisioning system 110 stores at the data storage 120 the template content data and the dynamic content component definition in relation with the application identifier. In some embodiments, the web application provisioning system 110 can receive content data corresponding to the dynamic content component definition from the computing device 130 and store the content data at the data storage 120. The content data may include, but not limited to, text data, image data, audio data, video data, and/or metadata. For the example web application interface 300 in FIG. 3, the web application provisioning system 110 can store the text data for the header 302, the icons 304, and the dynamic content component definitions corresponding to the dynamic content components 310, 312, 314, 316 at the data storage 120. The web application provisioning system 110 can also receive the data contents for the dynamic content components 310, 312, 314, 316 and store the data contents at the data storage 120. The web application provisioning system 110 can also receive other data corresponding to the dynamic content components 310, 312, 314, 316 at the data storage 120. In various embodiments, the content data may vary depending on the type of web application being created so that the web application provisioning system 110 can store different content data, depending on whether the web application is a dynamic web application, a progressive web application, a mini program (e.g., which runs in WeChat™), an Ali mini program, or an Ali H5.

When a request for the web application is received by the web application provisioning system 110, the web application provisioning system 110 can operate to conduct method 200 to provide the web application to the computing device 130.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to herein as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims.

We claim:

1. A method for providing a web application to a computing device, the method comprising operating a system processor to:
receive, from the computing device, an application request comprising an application identifier associated with the web application;
retrieve, from a data storage, an application template corresponding to the application identifier;
build an application structure based at least on the retrieved application template and the application identifier;
transmit the application structure and a structure resolver to the computing device, the receipt of the structure resolver at the computing device triggers a device processor to resolve each dynamic content component defined within the application structure by:
determining, from the application structure, a layout definition of the dynamic content component;
determining, from the layout definition, the dynamic content component comprises at least one nested dynamic content component;
in response to determining the dynamic content component comprises the at least one nested dynamic content component, operating the device processor to resolve each nested dynamic component by:
determining a layout definition for a first level component of the nested dynamic content component;
constructing the first level component of the nested dynamic content component based on the layout definition, wherein constructing the first level component comprises:
determining a layout definition for a subsequent level component of one or more subsequent level components; and
constructing each subsequent level component; and
retrieving a content data for the dynamic content component from the data storage.

2. The method of claim 1, wherein constructing each subsequent level component comprises retrieving the content data for the respective subsequent level component.

3. The method of claim 1, wherein constructing each subsequent level component comprises:
determining a layout definition for a further subsequent level component of one or more further subsequent level components; and
constructing each further subsequent level component.

4. The method of claim 1, wherein constructing the first level component comprises:
determining a layout definition for each subsequent level component and constructing the respective subsequent level component until the layout definition for a subsequent level component comprises a lowest level component.

5. The method of claim 1, wherein building the application structure comprises:
retrieving from the database at least one dynamic content component definition corresponding to the application identifier; and
building the application structure based at least on the retrieved application template, the retrieved at least one dynamic content component definition, and the application identifier.

6. The method of claim 1, wherein the receipt of the structure resolver triggers the device processor to retrieve template content data corresponding to the application template.

7. The method of claim 1, wherein:
the receipt of the structure resolver at the computing device further triggers the device processor to establish at least one connection between the computing device and a web application server.

8. The method of claim 1, wherein establishing the at least one connection comprises receiving, at the computing device, at least one push message from the web application server.

9. The method of claim 1, wherein the content data for the dynamic content component is retrieved based at least on a type of the web application.

10. A system for providing a web application to a computing device, the system comprising:
a processor operable to:
receive, from the computing device, an application request comprising an application identifier associated with the web application;
retrieve from a data storage an application template corresponding to the application identifier;
build an application structure based at least on the retrieved application template and the application identifier;
transmit the application structure and a structure resolver to the computing device, the receipt of the structure resolver at the computing device triggers a device processor to resolve each dynamic content component defined within the application structure by:
determining, from the application structure, a layout definition of the dynamic content component;
determining, from the layout definition, the dynamic content component comprises at least one nested dynamic content component;
in response to determining the dynamic content component comprises the at least one nested dynamic content component, operating the device processor to resolve each nested dynamic component by:
determining a layout definition for a first level component of the nested dynamic content component;
constructing the first level component of the nested dynamic content component based on the layout definition, wherein constructing the first level component comprises:
determining a layout definition for a subsequent level component of one or more subsequent level components; and
constructing each subsequent level component; and
retrieving a content data for the dynamic content component from the data storage.

11. The system of claim 10, wherein constructing each subsequent level component comprises retrieving the content data for the respective subsequent level component.

12. The system of claim 10, wherein constructing each subsequent level component comprises:
determining a layout definition for a further subsequent level component of one or more further subsequent level components; and
constructing each further subsequent level component.

13. The system of claim 10, wherein constructing the first level component comprises:
determining a layout definition for each subsequent level component and constructing the respective subsequent level component until the layout definition for a subsequent level component comprises a lowest level component.

14. The system of claim 10, wherein building the application structure comprises:
retrieving from the database at least one dynamic content component definition corresponding to the application identifier; and
building the application structure based at least on the retrieved application template, the retrieved at least one dynamic content component definition, and the application identifier.

15. The system of claim 10, wherein the receipt of the structure resolver triggers the device processor to retrieve template content data corresponding to the application template.

16. The system of claim 10, wherein:
the application structure comprises at least one proxy initializer; and
the proxy initializer triggers the processor of the computing device to establish at least one connection between the computing device and a second computing device.

17. The system of claim 16, wherein the at least one connection delivers at least one push message from the second computing device to the computing device.

18. The system of claim 10, wherein the content data for the dynamic content component is retrieved based at least on a type of the web application.

* * * * *